(12) United States Patent (10) Patent No.: US 6,471,155 B2
Haruta et al. (45) Date of Patent: Oct. 29, 2002

(54) WIRE WINDING METHOD AND WIRE WINDING APPARATUS FOR STATOR CORE

(75) Inventors: Youichi Haruta, Gunma (JP); Kazuyoshi Kobayashi, Gunma (JP)

(73) Assignee: Sawafuji Electric Co., Ltd., Tokyo (JP)

( * ) Notice: Subject to any disclaimer, the term of this patent is extended or adjusted under 35 U.S.C. 154(b) by 0 days.

(21) Appl. No.: 09/885,531

(22) Filed: Jun. 21, 2001

(65) Prior Publication Data

US 2002/0017585 A1 Feb. 14, 2002

(51) Int. Cl.[7] ............................................. H02K 15/085
(52) U.S. Cl. .................................. 242/433.3; 242/433.4
(58) Field of Search ........................... 242/433.3, 433.4, 242/437, 437.4, 437.3, 411, 417.3

(56) References Cited

U.S. PATENT DOCUMENTS

| 4,335,856 A | * | 6/1982 | Fuzita | 242/433.4 |
| 6,334,585 B1 | * | 1/2002 | Becherucci et al. | 242/433.3 |
| 6,349,895 B1 | * | 2/2002 | Becherucci et al. | 242/433.3 |

FOREIGN PATENT DOCUMENTS

| EP | 0536981 A2 | * | 4/1993 | ............... 242/433.3 |
| EP | 0553898 A2 | * | 8/1993 | ............... 242/433.3 |
| JP | 05069041 A | * | 3/1993 | ............... 242/417.3 |
| JP | 10-112962 |  | 4/1998 |  |

* cited by examiner

*Primary Examiner*—Kathy Matecki
*Assistant Examiner*—Sang Kim
(74) *Attorney, Agent, or Firm*—Arent Fox Kintner Plotkin & Kahn

(57) ABSTRACT

A method and an apparatus of winding a wire for a stator core in which, in order to wind a wire on a plurality of poles provided along an outer periphery of a stator core, a tension acting on the wire during the time when the wire between a pole on which the wire is wound and a wire support passes on each of side formers is made lower than a tension acting on the wire from the time when the wire between the pole on which the wire is to be wound and the wire support has passed on one of the side formers to the time when the wire starts to come into contact with the other thereof. Therefore, even a relatively thick wire can be wound while being prevented from getting bend marks, whereby a quality as a stator can be improved.

2 Claims, 7 Drawing Sheets

WIRE WINDING METHOD AND WIRE WINDING APPARATUS FOR STATOR CORE

BACKGROUND OF THE INVENTION

1. Field of the Invention

The present invention relates to an improvement in wire winding method and wire winding apparatus for winding a wire on a plurality of poles provided along an outer periphery of a stator core.

2. Description of the Prior Art

A method and an apparatus for winding a wire on each pole of a stator core have already been disclosed in Japanese Patent Laid-Open No. 10-112962, for example.

In the above-described conventional method and apparatus, a wire is wound on a pole as an object the wire is to be wound, by revolving a wire support that supports an intermediate portion of a tense wire while allowing the wire to run. In this case, when a thick wire with a diameter exceeding 1.1 mmØ is wound, it is difficult to wind the wire because bend marks remain on the wire. If the wire tension is set large to prevent the wire from getting bend marks, the wire is damaged undesirably.

The cause for such a phenomenon will be explained with reference to FIGS. 5 and 6. The wire support revolves around a revolution centerline C, which passes through the center of a pole P on which the wire is to be wound and is perpendicular to the axis of a stator core 11, so as to draw a circular path T indicated by a chain line. In this case, the length of a wire 13 from a contact point of the wire 13 with the pole P to the wire support varies because the pole P has a rectangular longitudinal cross section that is long in the axial direction of the stator core 11. Specifically, the wire length from the contact point of the wire 13 with the pole P to the wire support (circular path T) varies as follows: Taking the wire length when the wire support is positioned at point PA between both side formers 14A and 14B as, for example, "1", the wire length when the wire support is positioned at point PB at which the wire 13 starts to come into contact with one side former 14A increases to, for example, "1.04", the wire length when the wire support is positioned at point PC at which the wire 13 is in contact with one side former 14A further increases to, for example, "1.27", and the wire length when the wire support is positioned at point PD at which the wire 13 separates from one side former 14A decreases to, for example, "1.26". Although the wire length at point PC from the contact point of the wire 13 with the pole P to the wire support (circular path T) is, for example, "1.12" in terms of straight distance, the length of the wire 13 at point PC is "1.27", which is longer than "1.12", as described above because the wire 13 is in contact with the side former 14A as shown in FIG. 6.

Thus, the wire length from the contact point of the wire 13 with the pole P to the wire support (circular path T) in the range WA in which the wire support travels from point PB to point PD to wind the wire 13 on one end face along the lengthwise direction of the pole P (axial direction of the stator core 11), that is, in the range in which the wire 13 passes on each of the side formers 14A and 14B is larger than the wire length from the contact point of the wire 13 with the pole P to the wire support (circular path T) in the range WB in which the wire support passes through point PA after separating from the side former 14A and travels to point PB to wind the wire 13 on one side face along the width direction of the pole P (direction perpendicular to the axis of the stator core 11), that is, in the range from the point where the wire 13 has passed on one of the side formers 14A and 14B to the point where the wire 13 starts to come into contact the other thereof, so that the tension acting on the wire 13 in the ranges WA, WA is higher than the tension acting on the wire 13 in the ranges WB, WB. Therefore, during the time when the wire support travels from point PA to point PD, the wire 13 starts to strongly come into contact with the side former 14A, 14B at point PB, and passes through point PC while being bent. Subsequently, the tension adversely decreases at point PD, so that the wire 13 undesirably gets a bend mark.

BRIEF SUMMARY OF THE INVENTION

The present invention has been achieved in view of the above situation, and accordingly an object thereof is to provide a winding method and a winding apparatus for a stator core, in which even a relatively thick wire can be wound while being prevented from getting bend marks, whereby the quality as a stator can be improved.

To attain the above object, according to a first feature of the present invention, there is provided a wire winding method for a stator core in which, in order to wind a wire on a plurality of poles having a rectangular longitudinal cross section that is long in an axial direction of said stator core, a pair of side formers for guiding the wire into slots on opposite sides of a pole on which said wire is to be wound among said plural poles are disposed on an outside of said stator core, and in this state, a wire support which supports an intermediate portion of the wire fed from a wire feeding means while allowing the wire to run and which can feed the wire in response to an action of a tension of a predetermined value or higher is revolved so as to draw a circular path around a revolution centerline which passes through the center of the pole on which the wire is to be wound, the revolution centerline being perpendicular to the axis of said stator core, the method comprising setting the tension acting on the wire during the time when the wire between the pole on which the wire is to be wound and said wire support passes on each of said side formers to be lower than the tension acting on the wire from the time when the wire between the pole on which the wire is to be wound and said wire support has passed on one of said side formers to the time when the wire starts to come into contact with the other thereof.

According to the first feature, the tension acting on the wire when the wire passes on the side formers is made relatively low, and the tension is made relatively high immediately after the wire has passed on the side former, so that even if the wire is relatively thick, the bent portion of the wire can be wound so as to adjust itself to the pole while preventing the wire from getting a bend mark at the portion bent by the side former to the utmost. Therefore, even a relatively thick wire can be wound while being prevented from getting bend marks, and also damage to the wire can be avoided, so that the quality as a stator can be improved.

Also, according to a second feature of the present invention, there is provided a wire winding apparatus for a stator core, comprising: a pair of side formers disposed on an outside of said stator core to guide a wire into slots on opposite sides of a pole on which the wire is to be wound among a plurality of poles having a rectangular longitudinal cross section that is long in the axial direction of said stator core; a wire feeding means disposed on the outside of said stator core so as to enable the feed of the wire in response to an action of a tension of a predetermined value or higher; a flier provided to be rotatable around a revolution centerline passing through the center of the pole on which the wire is to be wound, the revolution centerline being perpendicular to the axis of said stator core, the flier having a wire support supporting an intermediate portion of the wire fed from said wire feeding means while allowing the wire to run and being provided at a position displaced from said revolution centerline; and a rotation driving means which rotates to drive said flier, wherein said winding apparatus further comprises: a movable pulley around which the wire is set at a position between said flier and said wire feeding means so that the tension of the wire is adjustable; and a movable pulley driving means provided between said rotation driving means and said movable pulley so as to move said movable pulley to a position at which the tension acting on the wire during the time when the wire between the pole on which the wire is to be wound and said wire support passes on each of said side formers is lower than the tension acting on the wire from the time when the wire between the pole on which the wire is to be wound and said wire support has passed on one of said side formers to the time when the wire starts to come into contact with the other thereof.

According to the second feature, the movable pulley is moved in association with the rotation of the flier that is rotated by the rotation driving means, whereby the tension acting on the wire when the wire passes on each of the side formers is made relatively low, and the tension is made relatively high immediately after the wire has passed on each of the side former, so that the above-described method according to the first feature can be carried out suitably.

The foregoing and other objects, features, and advantages of the present invention will become more apparent by reference to the description of preferred embodiments given below in detail in connection with the accompanying drawings.

BRIEF DESCRIPTION OF THE DRAWINGS

FIG. 1 is a perspective view of an apparatus in accordance with the present invention;

FIG. 2 is a side view of the apparatus in accordance with the present invention;

FIG. 3 is a schematic perspective view for illustrating an operation of a movable pulley driving means in a state in which a tension of a wire is intensified;

FIG. 4 is a schematic perspective view for illustrating an operation of the movable pulley driving means in a state in which the tension of the wire is loosened;

FIG. 5 is a side view of a stator core and side formers in a state in which the wire is wound; and FIG. 6 is a view taken from a direction of an arrow 6 of FIG. 5.

DETAILED DESCRIPTION OF THE PREFERRED EMBODIMENTS

Figure 1:
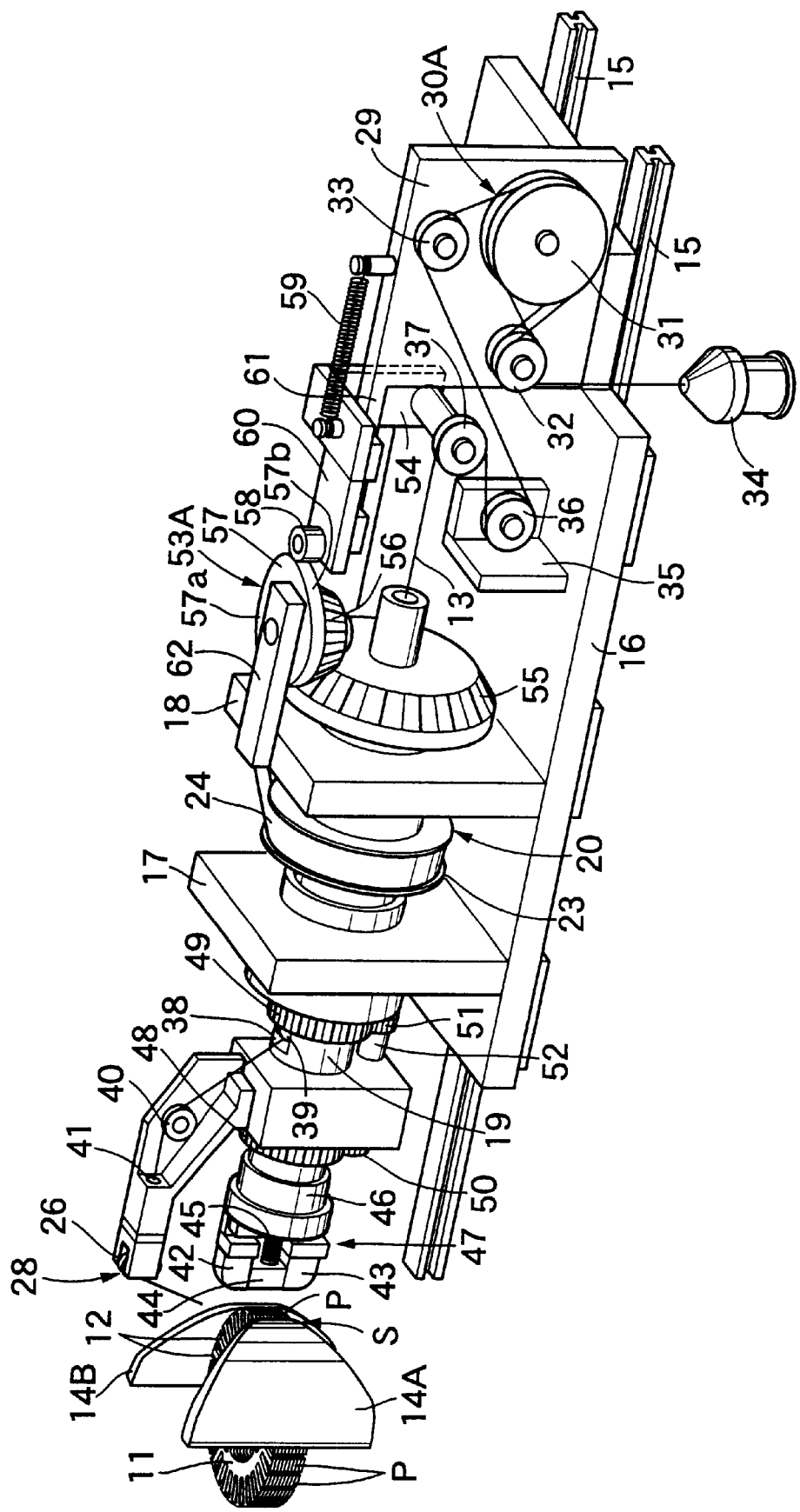
FIGS. 1 to 6 show a first embodiment of the present invention.
Figure 2:
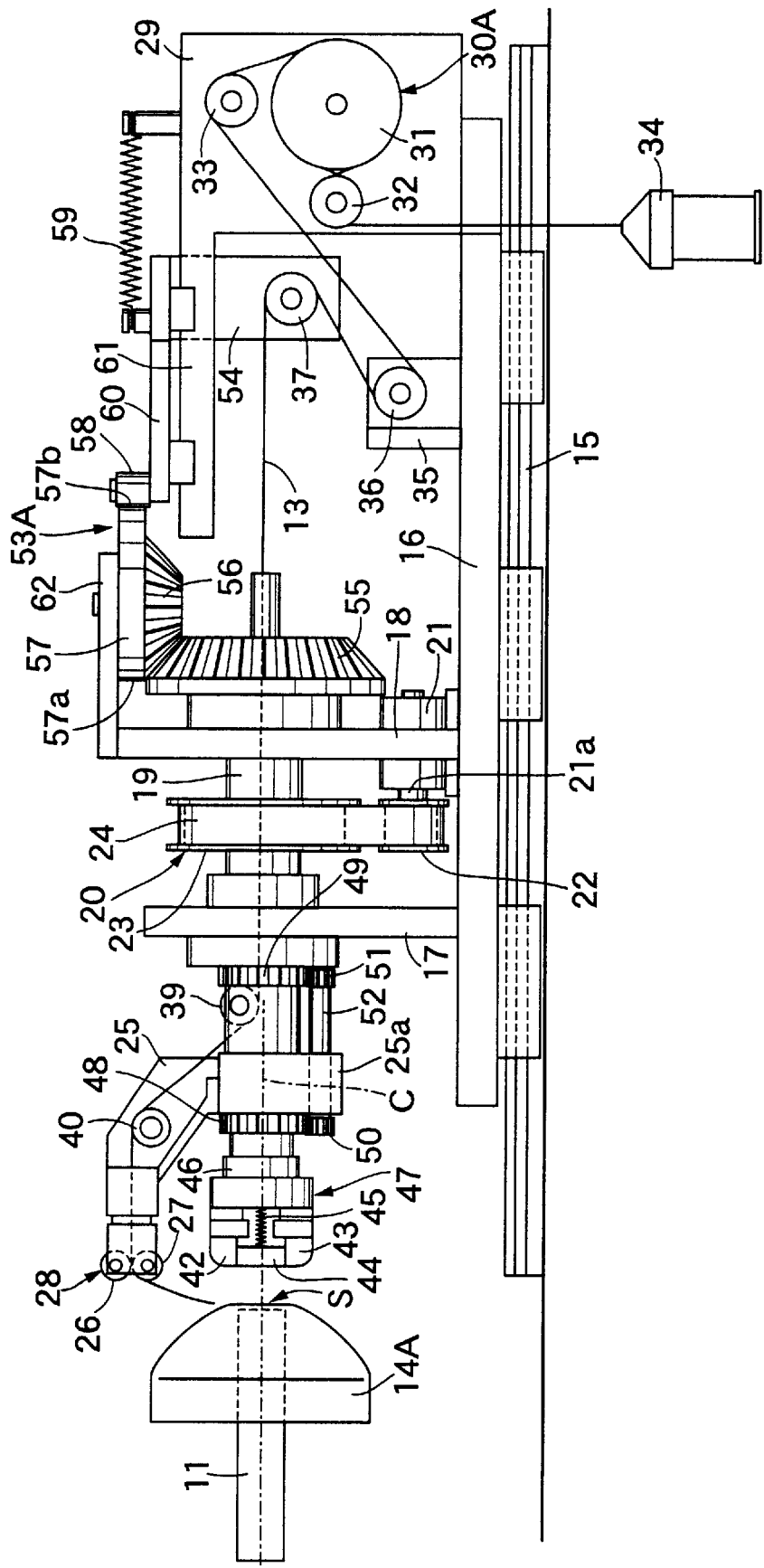

A first embodiment of the present invention will be described with reference to FIGS. 1 to 6. In FIGS. 1 and 2, a stator core 11 used for an outer rotor-type electric motor is provided integrally with a plurality of poles P, P . . . each having a rectangular longitudinal cross section that is long in the axial direction of the stator core 11, the poles P, P . . . being arranged at equal intervals in the circumferential direction of the stator core 11, so that slots 12 are formed between the poles P, P . . . By winding a wire 13 on each pole P, P . . . , a stator is formed.

In winding the wire 13 on each pole P, P . . . , the stator core 11 is placed and positioned on a rotating table (not shown) that is rotatable around the vertical axis coaxial with the axis of the stator core 11. The rotating table is intermittently subjected to angular displacement so that the poles P, P . . . on which the wire is to be wound are successively brought to a winding position S set at one location in the circumferential direction of the rotating table.

Among the poles P, P . . . , the pole P on which the wire is to be wound is positioned at the winding position S. In this state, a pair of side formers 14A and 14B for guiding the wire 13 to the slots 12, 12 on opposite sides of the pole P on which the wire is to be wound are fixedly disposed on the outside of the stator core 11. The side former 14A, 14B has, as a whole, a shape curved in an arcuate form so as to substantially correspond to the outer periphery of the stator core 11, and moreover is formed so that the width in the vertical direction decreases gradually toward the pole P on which the wire is to be wound, positioned at the winding position S.

A pair of rails 15, 15 parallel with the axis of the stator core 11 and a horizontal straight line passing through the winding position S are laid on a floor. On these rails 15, 15 is placed a carriage 16 that comes close to and goes away from the winding position S by means of carriage driving means, not shown.

On the carriage 16, first and second support plates 17 and 18 are erected with a clearance provided in the lengthwise direction of the rails 15, 15. The first and second support plates 17 and 18 support a rotating shaft 19, the axis of which is the revolution centerline C that passes through the center of the pole P on which the wire is to be wound, positioned at the winding position S, and is perpendicular to the axis of the stator core 11, so that the rotating shaft 19 is rotatable around the axis thereof. The rotating shaft 19 is connected with a rotation driving means 20 at a position between the first and second support plates 17 and 18. The rotation driving means 20 includes an electric motor 21 fixedly disposed on the carriage 16 so as to have the axis of rotation parallel with the axis of the rotating shaft 19, a driving pulley 22 fixed to an output shaft 21a of the electric motor 21, a driven pulley 23 fixed on the outer face of the rotating shaft 19 at a position between the first and second support plates 17 and 18, and an endless transmission belt set around the driving pulley 22 and the driven pulley 23.

At a distal end of the rotating shaft 19 on the side of the winding position S, a proximal portion 25a of a flier 25 is fixed. The flier 25 can be rotated around the revolution centerline C together with the rotating shaft 19. Furthermore, at the distal end of the flier 25 disposed at a position displaced sideward from the revolution centerline C, a wire support 28 consisting of a pair of rollers 26 and 27 holding the wire 13 therebetween is provided in such a manner as to support the wire 13 while allowing the wire to run. Therefore, the wire support 28 revolves around the revolution centerline C so as to draw a circular path T (see FIGS. 3 and 4) as the flier 25 rotates together with the rotating shaft 19.

On the carriage 16 in the end portion on the side opposite to the winding position S, a third support plate 29 of a flat plate shape is erected along the revolution centerline C, and a wire feeding means 30A is disposed on the third support plate 29.

The wire feeding means 30A includes two tension pulleys 31 and 32, large and small, each having a horizontal axis perpendicular to the revolution centerline C and being supported rotatably on the third support plate 29, and an idle pulley 33 having a horizontal axis perpendicular to the revolution centerline C and being supported rotatably on the third support plate 29 above the tension pulleys 31 and 32. The wire 13 supplied from a wire bobbin 34 is set around both the tension pulleys 31 and 32 so as to draw a character of "8", and the wire 13 pulled out of the tension pulley 31 is set around the idle pulley 33.

The wire feeding means 30A constructed as described above is used for feeding the wire 13 in response to a tension of a predetermined value or higher being applied to the wire 13. The wire 13 fed from the wire feeding means 30A is set sequentially around a fixed pulley 36, which is supported on a pulley support plate 35 fixed on the carriage 16 at a position between the second and third support plates 18 and 29 so as to be rotatable around the horizontal axis thereof perpendicular to the revolution centerline C, and a movable pulley 37 capable of being moved along the revolution centerline C. The wire 13 fed from the movable pulley 37 is inserted into the rotating shaft 19.

A pullout hole 38 is formed in the side wall of the rotating shaft 19 at a position between the flier 25 and the first support plate 17, and an idle pulley 39 disposed in the pullout hole 38 is supported rotatably. The wire 13 which is set around the idle pulley 39 in the rotating shaft 19 and is pulled out to the outside through the pullout hole 38, is set around an idle pulley 40 supported rotatably on the flier 25, and is inserted into an insertion hole 41 formed in the distal end portion of the flier 25. The aforementioned wire support 28 is disposed in front of the insertion hole 41, and the wire 13 fed through the insertion hole 41 is supported by the wire support 28 so as to be capable of running.

That is to say, the intermediate portion of the wire 13 fed from the wire feeding means 30A is supported by the wire support 28 so as to be capable of running.

Between the proximal portion 25a of the flier 25 and the winding position S, there is disposed a main former 47 consisting of upper and lower guides 42 and 43 for holding the pole P on which the wire is to be wound therebetween, an abutting plate 44 disposed slidably between the upper and lower guides 42 and 43 so as to be able to be in contact with the outer end face of the pole P on which the wire is wound, and a spring 45 for providing a spring force in the direction such that the abutting plate 44 is brought into contact with the outer end face of the pole P on which the wire is to be wound, which elements are disposed on a former main part 46.

The former main part 46 of the main former 47 is supported on the rotating shaft 19 so as to disable the relative movement in the axial direction and to enable the relative rotation around the axis. Moreover, the former main part 46 and the first support plate 17 are fixedly mounted with coaxial gears 48 and 49 with the same diameter, respectively, and a pair of pinions 50 and 51 meshing with the gears 48 and 49, respectively, are fixed at opposite ends of a shaft 52 having an axis parallel with the rotating shaft 19 and being supported rotatably on the proximal portion 25a of the flier 25. Thereby, the main former 47 is fixedly disposed in front of the flier 25 without rotating around the revolution centerline C despite the rotation of the rotating shaft 19.

Figure 3:
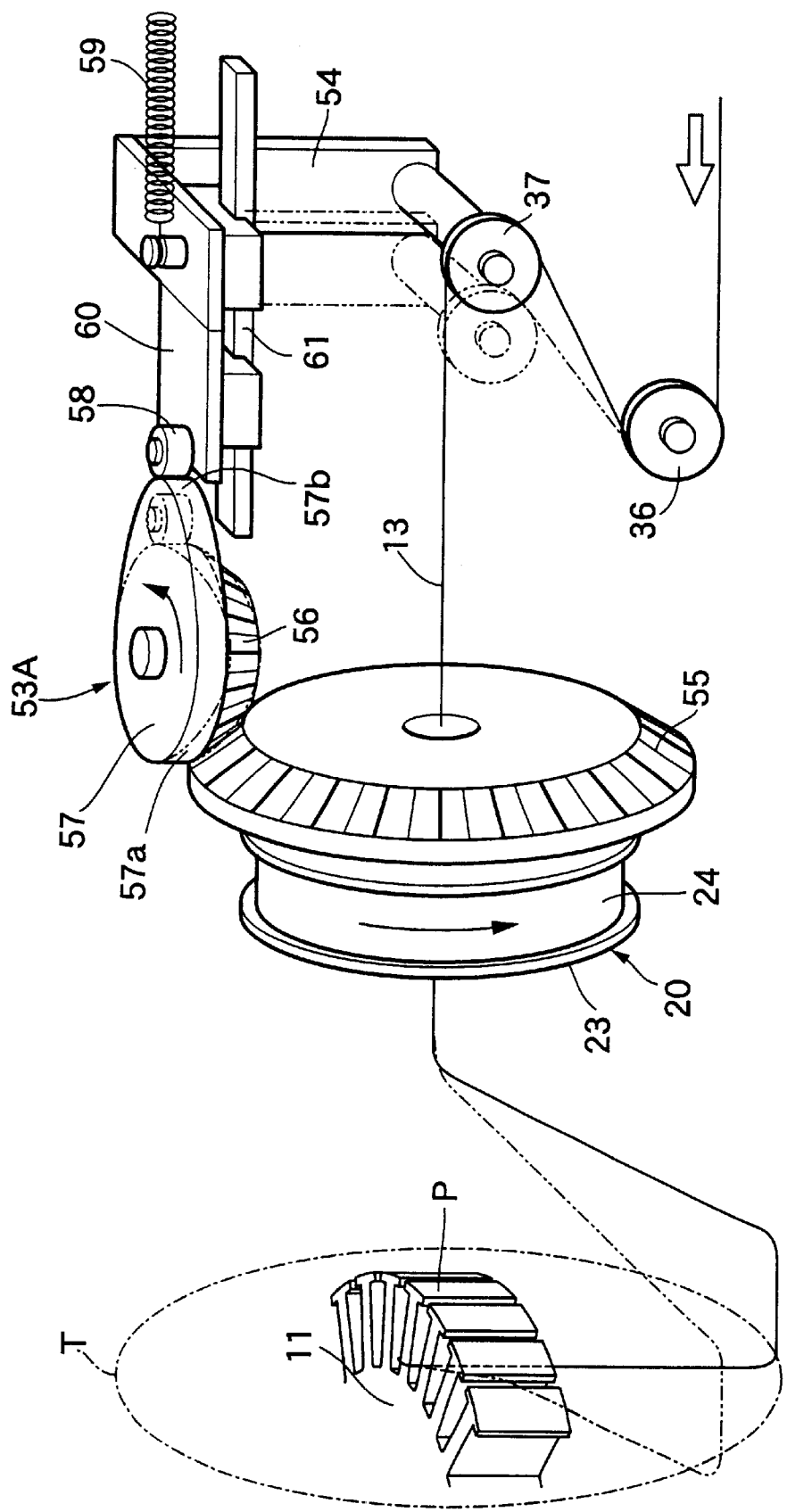
Figure 4:
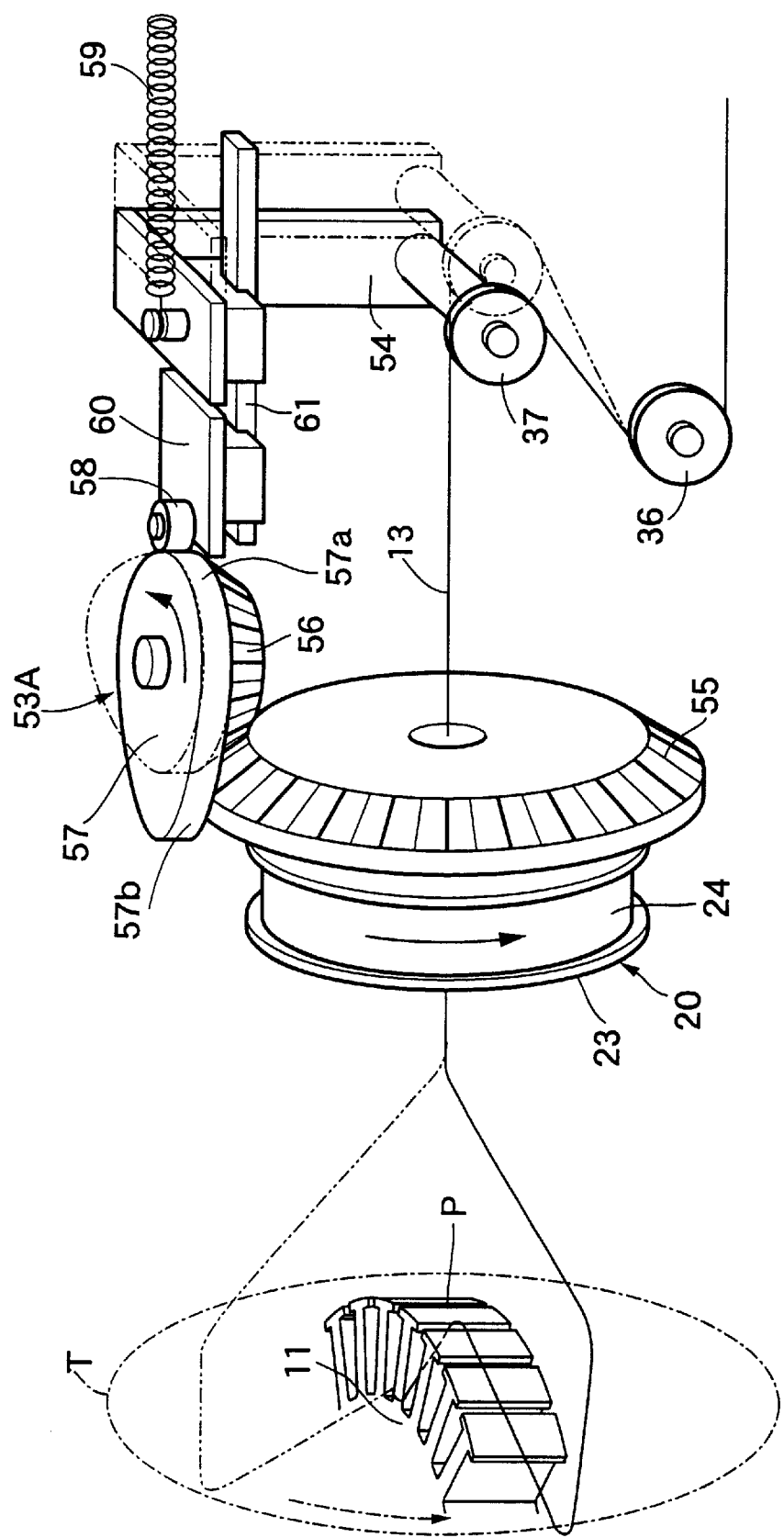

Referring also to FIGS. 3 and 4, a movable pulley driving means 53A is provided between the rotation driving means 20 and the movable pulley 37. The movable pulley driving means 53A includes a movable support plate 54 which rotatably supports the movable pulley 37 and is movable in the direction along the revolution centerline C, a driving bevel gear 55 fixed on the rotating shaft 19, a driven bevel gear 56 meshing with the driving bevel gear 55, a cam 57 rotating integrally with the driven bevel gear 56, a roller 58 being in rolling contact with the cam 57, a spring 59 for urging the movable support plate 54 in the direction such that the roller 58 is separated from the cam 57, and a roller support plate 60 which rotatably supports the roller 58 and is connected to the movable support plate 54.

At the upper part of the third support plate 29, there is provided a support arm 61 extending in parallel with the revolution centerline C. The movable pulley 37 is supported on the movable support plate 54 which is supported slidably on the support arm 61 so that the movable pulley 37 can rotate around the horizontal axis perpendicular to the revolution centerline C.

The driving bevel gear 55 is fixed to the rotating shaft 19 on the side opposite to the driven pulley 23 with respect to the second support plate 18, and the driven bevel gear 56 which is supported on a stay 62 provided at the upper part of the second support plate 18 so as to be rotatable around the vertical axis, is meshed with the driving bevel gear 55. Moreover, the gear ratio of the driving bevel gear 55 and the driven bevel gear 56 is set at 2:1, so that the driven bevel gear 56 rotates two turns while the rotating shaft 19 and the driving bevel gear 55 rotate one turn.

The cam 57 is supported on the stay 62 integrally with the driven bevel gear 56 so as to be rotatable around the vertical axis. The cam 57 is provided on its outer peripheral face with a base circular part 57a with the axis of rotation thereof being the center and a lobe part 57b projecting sideward from the base circle part 57a, and rotates two turns while the rotating shaft 19 rotates one turn. A roller support plate 60 is disposed between the cam 57 and the movable support plate 54, and a roller 58 is supported at the cam-side end of the roller support plate 60 so as to be rotatable around the vertical axis. Moreover, the roller support plate 60 is supported by the support arm 61 so as to enable the relative movement thereof with respect to the movable support plate 54 in the lengthwise direction of the support arm 61 in a limited range, and is connected to the movable support plate 54. Between the roller support plate 60 and the movable support plate 54, there is provided a spring (not shown) for providing a weak spring force enough to bring the roller 58 into rolling contact with the cam 57, so that the roller 58 is always in rolling contact with the cam 57.

The spring 59, which is disposed between the movable support plate 54 and the third support plate 29, provides a spring force in the direction such that the movable support plate 54 goes away from the cam 57, that is, the direction such that the movable pulley 37 supported on the movable support plate 54 goes away from the winding position S. Moreover, the spring force provided by the spring 59 is set at a value lower than the tension acting on the wire 13 between the movable pulley 37 and the pole P when the wire 13 is wound on the pole P.

According to the movable pulley driving means 53A constructed as described above, in the state in which the roller 58 is in rolling contact with the lobe part 57b of the cam 57 when the wire 13 is wound on the pole P, the movable pulley 37 moves in the direction to go away from the stator core 11 as shown in FIG. 3, so that the wire 13 between the pole P and the wire feeding means 30A is subjected to a high tension. The wire feeding means 30A feeds the wire 13 in response to the action of the high tension. When the roller 58 is brought into rolling contact with the base circle part 57*a* of the cam 57 by the rotation of the cam as shown in FIG. 4, the movable pulley 37 moves from a position indicated by a solid line in FIG. 3 to a position indicated by a solid line in FIG. 4 in the direction to come close to the stator core 11. By this movement of the movable pulley 37, the wire 13 is loosened, so that the feed of the wire 13 from the wire feeding means 30A is ceased. In this case, the wire 13 is subjected to a low tension enough to balance with the spring force of the spring 59.

Accordingly, the cam 57 is integrated with the driven bevel gear 56 in such a manner that, from the time when the wire 13 between the pole P on which the wire is to be wound and the wire support 28 has passed on one of the side formers 14A and 14B to the time when the wire 13 starts to come into contact with the other thereof, the lobe part 57*b* is brought into rolling contact with the roller 58 so that the movable pulley 37 goes away from the stator core 11, and during the time when the wire 13 between the pole P on which the wire is to be wound and the wire support 28 passes on each of the side formers 14A and 14B, the base circle part 57*a* is positioned so as to correspond to the roller 58 so that the movable pulley 37 comes close to the stator core 11.

Figure 5:
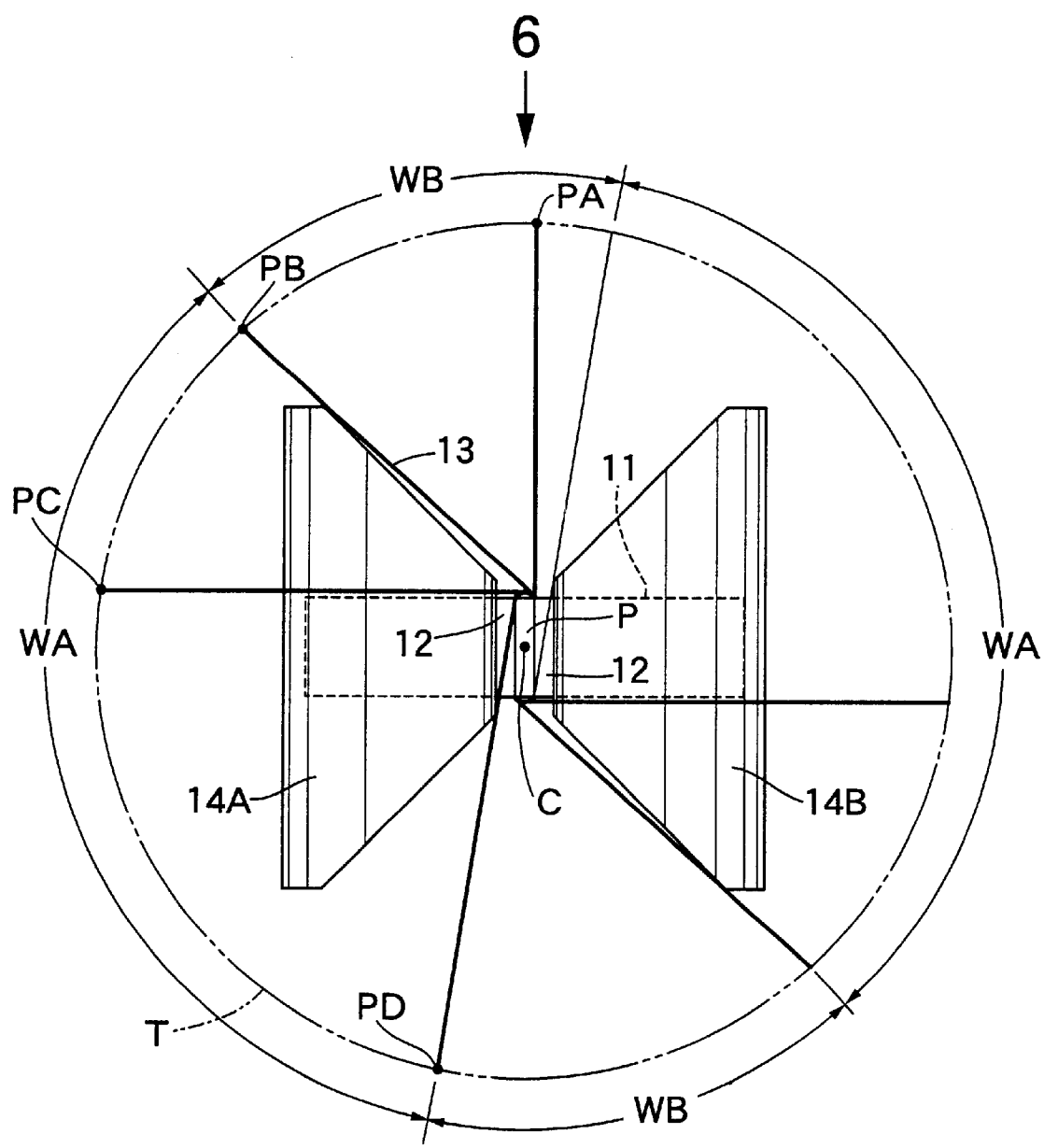

Referring to FIG. 5, the tension acting on the wire 13 in the ranges WA, WA in which the wire 13 contacts each of the side formers 14A and 14B is lower than the tension acting on the wire 13 in the ranges WB, WB from the point where the wire 13 has passed out of contact with one of the side formers 14A and 14B to the point where the wire starts to come into contact with the other thereof.

The following is a description of the operation of the first embodiment. In winding the wire 13 on each pole P, P . . . of the stator core 11, the carriage 16 is moved toward the stator core 11 in the state in which the pole P on which the wire is to be wound is disposed at the winding position S, and the rotating shaft 19 is rotationally driven by the rotation driving means 20 in the state in which one end of the wire 13 pulled out of the wire support 28 is set on the pole P. By the rotation of the rotating shaft 19, the flier 25 is also rotated around the revolution centerline C, so that the wire support 28 revolves so as to draw the circular path T around the revolution centerline C.

By the revolution of the wire support 28, the wire 13 is guided by the side formers 14A and 14B to the slots 12, 12 on opposite sides of the pole P on which the wire is to be wound, and is wound on the pole P. Moreover, the wire 13 is wound on the pole P so as to move gradually from the proximal end to the distal end of the pole P, and the movement of a location at which the wire 13 is wound on the pole P is accomplished by the movement of the carriage 16.

In the winding of the wire 13 on the pole P in the above-described manner, the tension acting on the wire 13 during the time when the wire 13 between the pole P and the wire support 28 passes on each of the side formers 14A and 14B is lower than the tension acting on the wire 13 from the time when the wire 13 between the pole P and the wire support 28 has passed on one of the side formers 14A and 14B to the time when the wire starts to come into contact with the other thereof.

Figure 6:
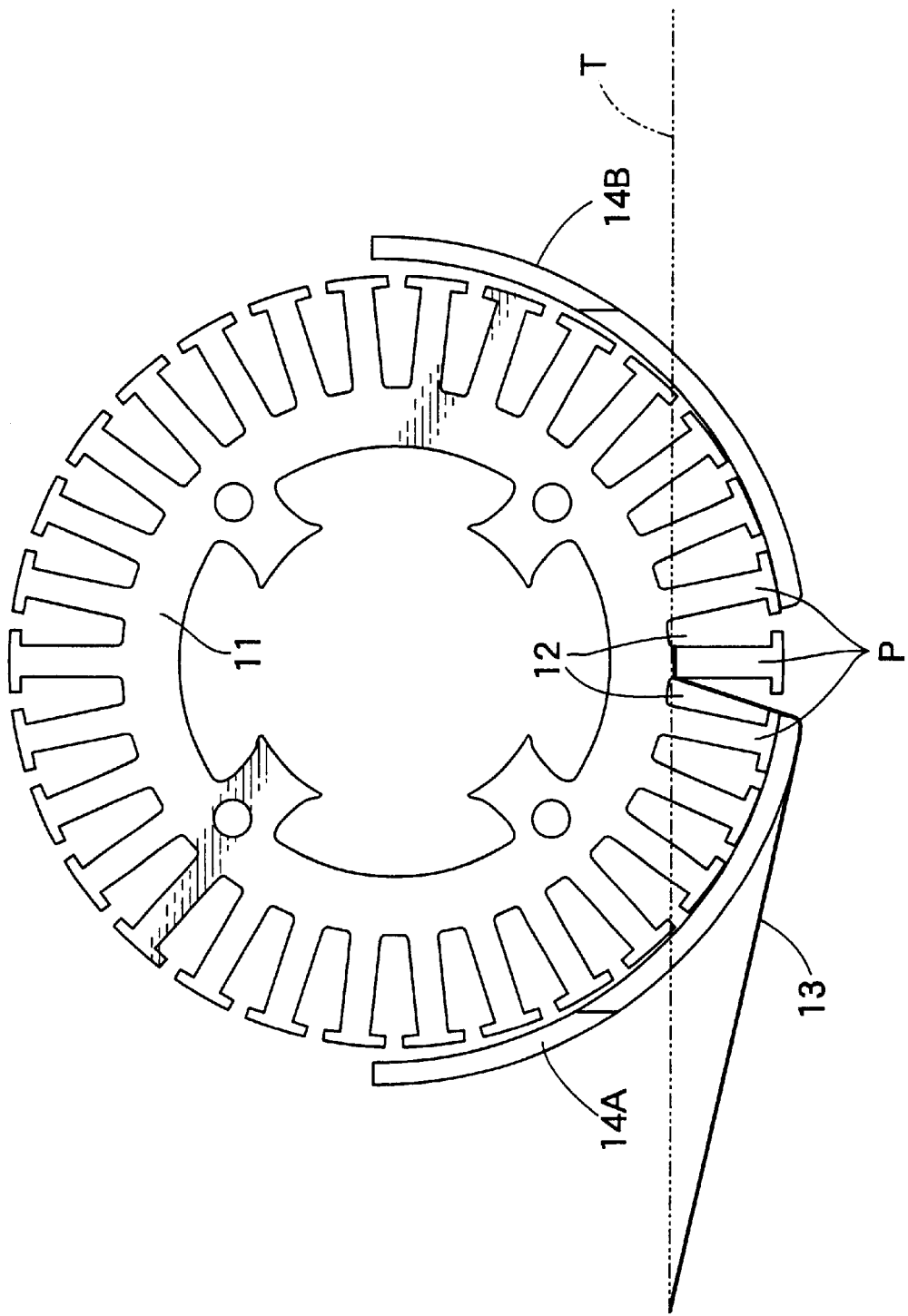

Therefore, at the time when the wire 13 passes on the side formers 14A and 14B, the wire 13 is bent by the side former 14A and 14B as shown in FIG. 6. However, even if the wire 13 has a relatively large diameter, for example, exceeding 1.1 mmØ, the formation of bend marks can be avoided to the utmost because the tension in the wire 13 passing on the side formers 14A and 14B is low. Also, since the tension in the wire 13 between the side formers 14A and 14B is high, the bent portion of the wire 13 produced by the side formers 14A and 14B can be wound so as to adjust itself to the pole P. As a result, even the relatively thick wire 13 can be wound on the pole P while being prevented from getting bend marks, and also damage to the wire 13 can be avoided so that the quality as a stator can be improved.

Also, the wire 13 is set around the movable pulley 37 at a position between the flier 25 and the wire feeding means 30A, and the movable pulley 37 is moved by the movable pulley driving means 53A provided between the rotation driving means 20 and the movable pulley 37, whereby the tension can be adjusted easily and reliably.

Figure 7:
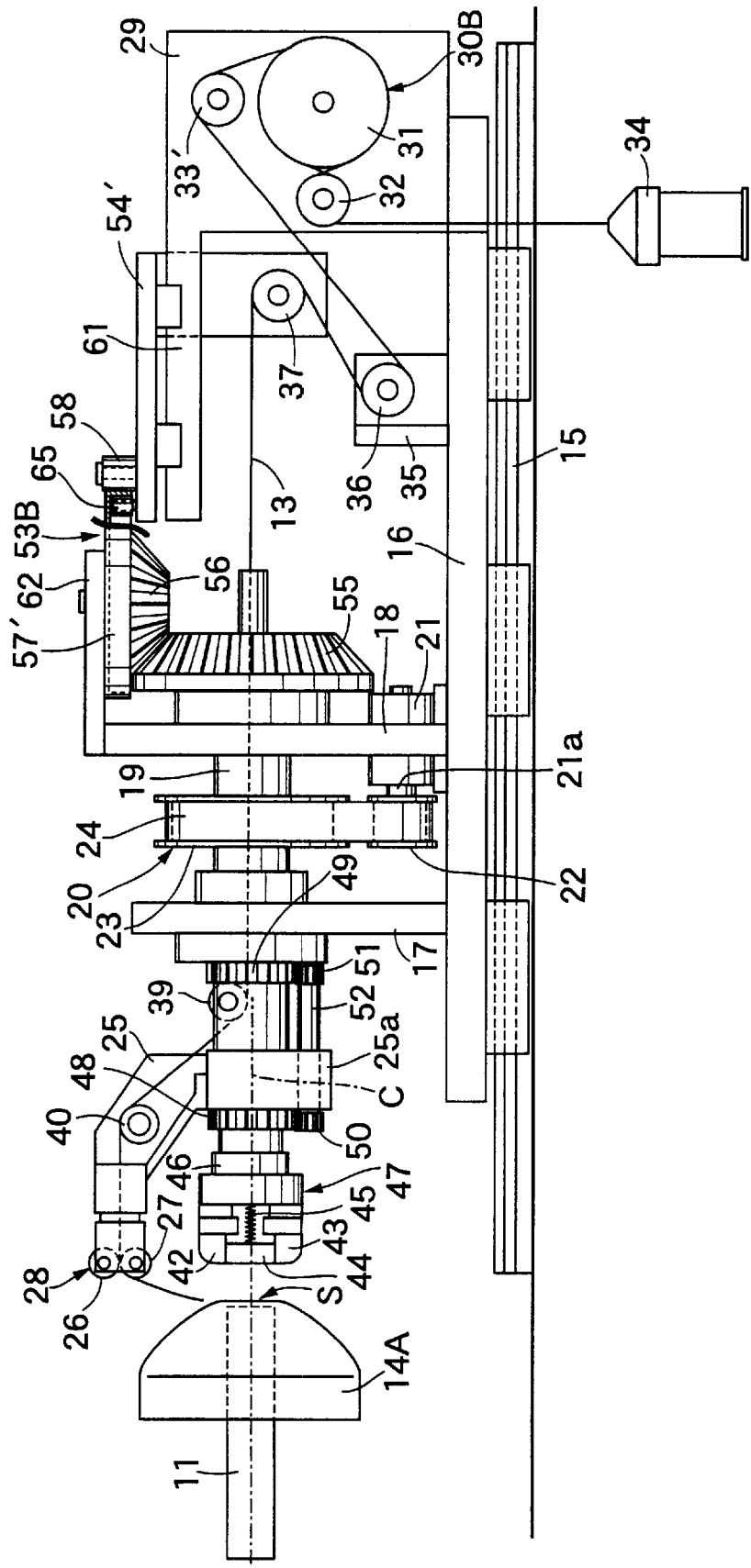
FIG. 7 is a side view, which corresponds to FIG. 2, showing a second embodiment of the present invention.

FIG. 7 shows a second embodiment of the present invention, in which the same reference numerals are applied to elements corresponding to those of the first embodiment.

A wire feeding means 30B disposed on the third support plate 29 includes the two tension pulleys 31 and 32, large and small, supported rotatably on the third support plate 29, and an idle pulley 33' having a horizontal axis perpendicular to the revolution centerline C and being supported rotatably on the third support plate 29 above the tension pulleys 31 and 32. The idle pulley 33' is supported rotatably on the third support plate 29 so as to be movable to the right and left in FIG. 7 in a limited range, and is urged toward the right-hand side of FIG. 7 by a spring.

A movable pulley driving means 53B provided between the rotation driving means 20 and the movable pulley 37 includes a movable support plate 54' which rotatably supports the movable pulley 37 and is movable in the direction along the revolution centerline C, the driving bevel gear 55 fixed on the rotating shaft 19, the driven bevel gear 56 meshing with the driving bevel gear 55, a cam 57' rotating integrally with the driven bevel gear 56, the roller 58 pivotally supported on the movable support plate 54' so as to be in rolling contact with outer periphery of the cam 57', and a roller 65 pivotally supported on the movable support plate 54' so as to be in rolling contact with the inner periphery of the cam 57'.

The cam 57' which rotates integrally with the driven bevel gear 56 supported on the stay 62 so as to be rotatable around the vertical axis, is formed to have cam faces corresponding to the outer and inner peripheries thereof. The rollers 58 and 65 are always in rolling contact with the outer and inner peripheries of the cam 57' respectively at a position where the two rollers holds the cam 57' therebetween.

According to this second embodiment, irrespective of the speed at which the wire 13 is wound on each pole P, P . . . of the stator core 11, the movable pulley 37 can be moved so as to correspond truly to the cam profile of the cam 57'. Also, since the idle pulley 33' of the wire feeding means 30B is urged by the spring toward the side on which the wire 13 is tensioned, when the feed of the wire 13 from the wire feeding means 30B is ceased, a low tension enough to balance with the spring force urging the idle pulley 33' is applied to the wire 13.

The above is a description of the embodiments of the present invention. The present invention is not limited to the above-described embodiments, and various design changes can be made without departing from the spirit and scope of the invention as hereinafter claimed.

What is claimed is:

1. A wire winding method for a stator core in which, in order to wind a wire on a plurality of poles having a rectangular longitudinal cross section that is long in an axial direction of said stator core, a pair of side formers for guiding the wire into slots on opposite sides of a pole on which said wire is to be wound among said plural poles are disposed on an outside of said stator core, and in this state, a wire support which supports an intermediate portion of the wire fed from a wire feeding means while allowing the wire to run and which can feed the wire in response to an action of a tension of a predetermined value or higher is revolved so as to draw a circular path around a revolution centerline which passes through the center of the pole on which the wire is to be wound, the revolution centerline being perpendicular to the axis of said stator core, the method comprising setting the tension acting on the wire during the time when the wire between the pole on which the wire is to be wound and said wire support is in contact with each of said side formers to be lower than the tension acting on the wire during the time when the wire between the pole on which the wire is to be wound and said wire support is out of contact with either of said side formers.

2. A wire winding apparatus for a stator core, comprising:

a pair of side formers disposed on an outside of said stator core to guide a wire into slots on opposite sides of a pole on which the wire is to be wound among a plurality of poles having a rectangular longitudinal cross section that is long in the axial direction of said stator core;

a wire feeding means disposed on the outside of said stator core so as to enable the feed of the wire in response to an action of a tension of a predetermined value or higher;

a flier provided to be rotatable around a revolution centerline passing through the center of the pole on which the wire is to be wound, the revolution centerline being perpendicular to the axis of said stator core, the flier having a wire support supporting an intermediate portion of the wire fed from said wire feeding means while allowing the wire to run and being provided at a position displaced from said revolution centerline; and a rotation driving means which rotates to drive said flier, wherein said winding apparatus further comprises:

a movable pulley around which the wire is set at a position between said flier and said wire feeding means so that the tension of the wire is adjustable; and a movable pulley driving means provided between said rotation driving means and said movable pulley so as to move said movable pulley to a position at which the tension acting on the wire during the time when the wire between the pole on which the wire is to be wound and said wire support is in contact with each of said side formers is lower than the tension acting on the wire during the time when the wire between the pole on which the wire is to be wound and said wire support is out of contact with either of said side formers.

* * * * *